3,199,528
BALL VALVE
Robert W. Oetjens, Arlington Heights, Ill., assignor to Clayton Mark & Company, Evanston, Ill., a corporation of Delaware
Filed Sept. 4, 1962, Ser. No. 221,213
6 Claims. (Cl. 137—329.01)

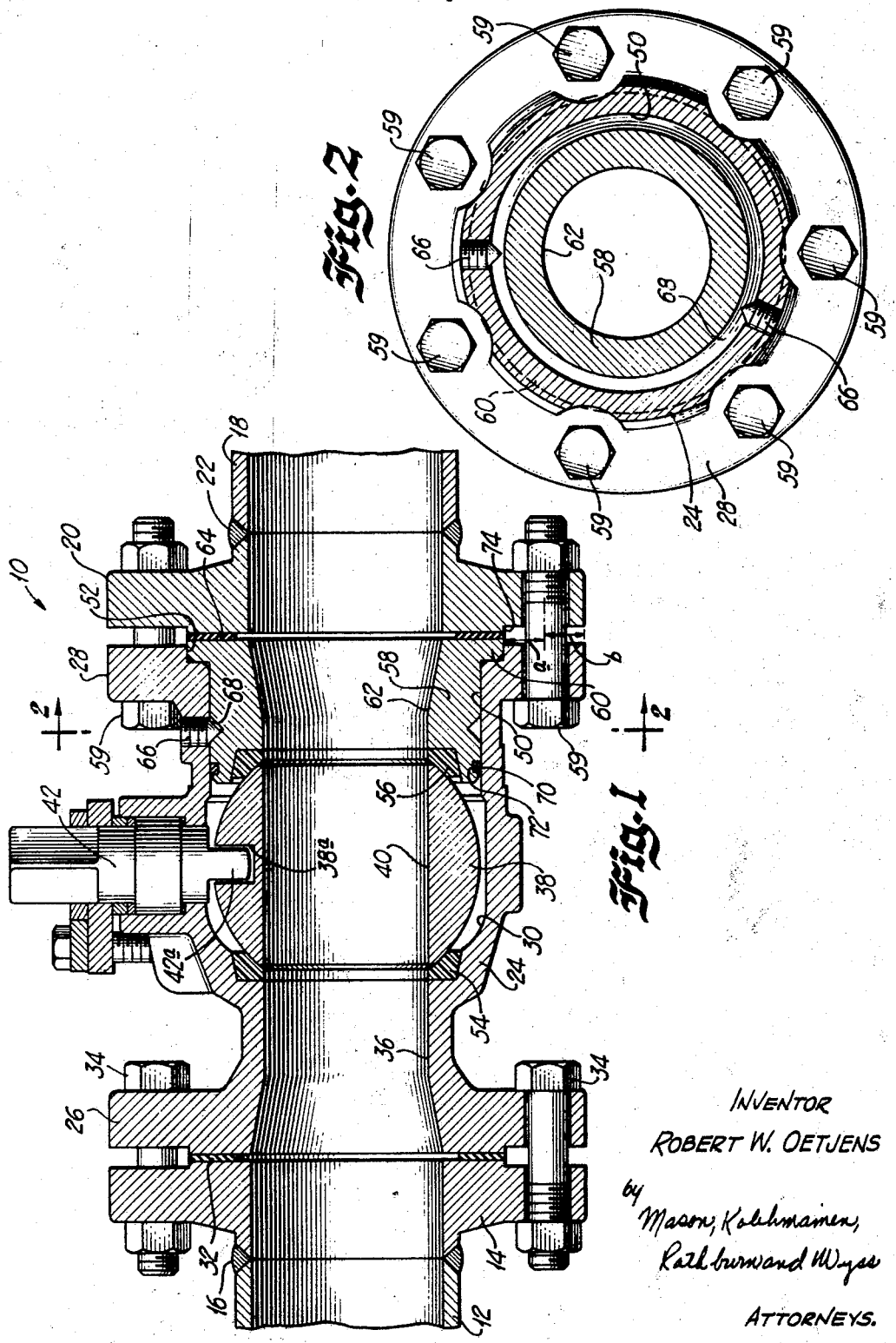

The present invention relates to ball valves and has for an object the provision of a new and improved flange type ball valve.

Another object of the invention is the provision of a new and improved ball valve that is easy to assemble and disassemble in desired angular position and economical to produce in mass production.

Another object of the present invention is the provision of a new and improved end entry type ball valve in which the valve is so constructed and arranged that it can be pivotally moved while attached to a pipe line to a position wherein the ball valve element may be removed from an end of the valve.

A further object of the invention is the provision of a new and improved ball valve having a body with a flow passage surrounded by a counterbore at one end adapted to receive a seating ring supporting spacer that may readily be secured to the valve body in any desired angular position and fixed lengthwise position and which is adapted to abut a flanged pipe end assembly.

A further object of the present invention is to provide a valve as set forth in the preceding paragraph in which the spacer projects slightly beyond a flanged end of the valve body for cooperation with a corresponding projecting portion of a flange type coupling.

Another object of the present invention is the provision of a new and improved ball valve as set forth in the preceding paragraph wherein the spacer may be held in assembled relation relative to the valve body by pointed set screws cooperatively arranged relative to an annular V-shaped peripheral groove in the spacer, and which screws may also be utilized to move the spacer to its fixed lengthwise position irrespective of the angular position of the spacer.

In brief, the valve includes a body having a central valve chamber and integral flanges at opposite ends surrounding flow passages through the body. One of the flow passages is relatively larger than the other so that a ball valve element can be inserted through it into the valve chamber. The ball valve element is seated for rotation between open and closed positions on opposed seating rings, one of which is mounted in the valve body and the other on a spacer inserted into the larger of the two flow passages. The spacer is flanged at its outer end and the flange fits into a counterbore at the outer end of the larger passage, thereby determining accurately the position of the spacer and the seating ring supporttd by it. The spacer may be initially located or secured in place in any angular position by set screws having pointed ends adapted to be forced against one side of a V-shaped external peripheral groove on the spacer. Once so located, the spacer is held in place securely as by flange bolts utilized to secure the valve to a pipe line. The end of the spacer projects a short distance beyond the flanged end of the valve body for cooperation with a projection on a flanged coupling element. The flanged coupling element, the flange on the body and the spacer are so arranged that the valve body can be pivoted around a pair of aligned bolts to a position in which the spacer and ball element can be removed. Accordingly, the valve can be suspended from the pipe line as for repair or displacement of the spacer, ball or seating rings.

Other objects and advantages will become apparent from the following detailed description and the accompanying drawings, in which:

FIG. 1 is an axial cross-sectional view taken along the longitudinal axis of a ball valve constructed in accordance with the present invention; and FIG. 2 is a transverse cross-sectional view taken substantially along the lines 2—2 of FIG. 1.

Referring to the drawing, the valve as a whole is indicated by the reference numeral 10. It is illustrated installed in a pipeline including an inlet pipe 12 having a flange 14 attached to the end thereof as by the welding 16 and an outlet pipe 18 having a flange 20 attached to the end thereof as by welding 22. Alternatively, the flow could be in the reverse direction.

The valve 10 comprises a valve body, indicated as a whole by the reference numeral 24, having integrally formed end flanges 26 and 28 and defining a valve chamber 30. The flange 26 has a face opposed to a face on the flange 14 and a gasket 32 is interposed between the faces of the flanges to provide a fluid tight seal between them. The flanges are held together by a plurality of bolts 34 adjacent the peripheral perimeter of the flanges. An axial passage 36 is provided in the valve body for the flow of fluid from the pipe 12 to the valve chamber 30.

A rotatable ball valve element or ball 38 is positioned in the chamber 30. It is provided with a passage 40 with a diameter substantially equal to the diameter of the passageway 36 in the valve body. The ball is rotatable around a vertical axis, as viewed in FIG. 1, between the position shown in FIG. 1 where the passageways 36 and 40 are in axial alignment to permit flow through the valve to an off position where the axis of passageway 40 in the ball is normal to the axis of passageway 36, thus shutting off flow through the valve.

The ball is rotated between its different positions by a stem 42 which is mounted on the body in known manner and turned by a handle that is not shown. The stem is relatively loosely coupled to the ball by a tongue 42a on the stem and a slot 38a in the ball arranged to permit the ball to be uncoupled from the stem upon endwise movement of the ball.

At the outlet side of the valve body there is provided a passageway 50 that is of a diameter such that the ball may be inserted through it into the valve chamber. At its outer end the passageway is provided with an annular counterbore 52.

The ball 38 is located between opposed seating rings 54 and 56, the former of which is mounted in the valve body adjacent passageway 36. The seating ring 56 is mounted in a spacer 58 received closely within passageway 50 and having an annular flange 60 fitting in counterbore 52. Engagement of flange 60 in the counterbore determines the lengthwise position of spacer 58 in the valve body and, thus, the location of seating ring 56 relative to the ball. Spacer 58 has a passageway 62 through it providing communication between passageway 40 in the ball and pipe 18. Flange 20 of pipe 18 is held by bolts 59 against flange 60 of the spacer 58, with a gasket 64 interposed between them.

The spacer is initially secured in any desired angular position and in fixed lengthwise location by means of a plurality (such as two) of set screws 66 having pointed ends engaging with one side of a V-shaped external groove 68 in the spacer. The arrangement is such that the pointed ends of the set screws force the spacer to the left until flange 60 is engaged against the valve body at the counterbore 52. If desired, the spacer may be moved otherwise, as in a press, to its proper lengthwise position, i.e., with flange 60 abutted against the counterbore 52 after which the set screws hold the spacer until the valve is installed. Upon installation, the bolts 59 are tightened and they effectively hold the spacer in position despite forces applied to it through the ball element.

Leakage of fluid between the valve body and spacer is prevented by an annular O-ring 70 mounted in an external groove 72 in the spacer.

The spacer flange 60 has a diameter corresponding generally to that of gasket 64 and the axial projection 74 on flange 20, whereby, upon assembly the flange 20 abuts only against the spacer, which in turn is abutted against the valve body.

The valve is constructed and arranged so that the spacer, ball element and seating rings can be removed from the valve body for repair or replacement without complete removal of the valve body. To achieve this result the openings for the bolts 59 are so located that when all the bolts are removed except, for example, the two lowest ones, then the valve body can be pivoted around them while remaining suspended from them. To enable this to be done the distance $a$ from the center lines of the bolt openings to the outer periphery of spacer flange 60 must be greater than the distance $b$ from the center lines to the outer periphery of flange 20. Also, movement of the valve at the opposite end must be possible, this being readily accomplished by having the flanges 14 and 20 constructed in conventional manner, as illustrated.

The valve of the present invention can be made economically. It requires no threaded elements other than the set screws and bolts. The construction and arrangement of the valve body and spacer provide accurate location of the seating rings with any angular position of the spacer, the position of which is determined by engagement of its flange with the body counterbore, which engagement is effected by the set screw-groove arrangement. Assembly and disassembly is accomplished quickly and simply.

While the present invention has been disclosed in conjunction with the details of an illustrative embodiment, these details are not intended to be limitative of the invention except as set forth in the accompanying claims.

What is claimed as new and desired to be secured by Letters Patent of the United States is:

1. A ball valve comprising a body having a valve chamber and a passageway communicating with said chamber, an unthreaded rotatable and lengthwise movable annular spacer positioned in said passageway and having a radial face adapted to abut against an opposed face in the valve body and an end face disposed axially beyond the body, an annular V-shaped groove on the outer surface of said spacer disposed intermediate its ends, securing means having V-shaped ends engageable with one of the surfaces of the V-shaped groove whereby the said securing means are adjustable toward the spacer to hold the latter with its radially disposed face in engagement with the corresponding face on the valve body, and a pipe flange engaging said end face additionally to secure said spacer in the body.

2. A ball valve having opposed flanged ends comprising a body defining a valve chamber and passages communicating with the chamber through said flanged ends, a ball valve element in said chamber movable between an off position and an on position, an unthreaded rotatable and lengthwise movable annular spacer positioned in one of said passages extending axially outwardly of one of said end flanges and terminating in a radially disposed face, stop means interposed between said spacer and said one passage for limiting axial inward movement of said spacer in said one passage, an annular groove defined on the external surface of said spacer inwardly from said outer end thereof, means mounted upon said body for engaging said groove on said spacer to hold said stop means engaged, sealing means interposed between said spacer and said one passage inwardly from said annular groove, and other means engaging said radially disposed face of the spacer for securing it in place in the body.

3. A ball valve comprising a valve body defining a ball receiving valve chamber and having opposed ends adapted for connecting said valve in a flow line, said body defining a first flow passage communicating between said chamber and one of said ends and of a diameter smaller than that of the ball, a second passageway of a diameter larger than that of the ball communicating with said chamber and the other of said ends, a counterbore at the outer end of said second passageway, an unthreaded rotatable and lengthwise movable annular ball valve element seating ring supporting spacer positioned in said second passageway and having an external flange adjacent its outer end abutting said counterbore, said spacer having a V-shaped annular groove on its external surface between its inner end and said flange, and set screw means radially positioned in said valve body adjacent said V-groove, said set screw means having pointed inner ends for engaging the inner face of said V-groove when tightened for holding or both moving the spacer lengthwise within said recess and holding it with said flange engaged against said shoulder, and other means engaging the end of the spacer for additionally securing it to the body.

4. A ball valve having opposed flanged ends comprising a body defining a valve chamber and passages communicating with the chamber through said flanged ends, a ball valve element in said chamber movable between an off position and an on position, and insertable into said chamber through one of said passages, means rotatably positioning said ball in said chamber including an unthreaded rotatable and lengthwise movable annular spacer positioned in said one of said passages and extending axially outwardly of one of said end flanges and terminating in a radially disposed face projecting a short distance axially beyond the flanged end of the body, said projecting portion of the spacer having an outer peripheral portion inset from the outer periphery of the flanged end of the body, and means including flanged pipe coupling means engaging the projecting face of the spacer for detachably securing said spacer in said body, the flanged end of said body and flanged pipe coupling means having aligned apertures and the securing means including bolts passing through said apertures, and the distance from the centerline of the bolt openings inwardly to the outer peripheral portion of the projecting portion of the spacer being greater than the distance from said centerline outwardly to the outer periphey of the flanged pipe coupling means.

5. A flange type ball valve adapted for end entry of the ball valve element, including in combination, a valve body comprising a body having a valve chamber, a passageway leading to said chamber and through which the ball valve element is insertable into said valve chamber, a flange on said body encircling said passageway, means including an annular spacer insertable into said passageway for rotatably supporting the ball valve element, said spacer projecting a short distance outwardly of the flange on the body, pipe coupling means including a flanged element, said flange and flanged element being circular and provided with aligned openings for securing bolts, the distance from the centerline of the bolt openings to the peripheral portion of the projecting portion of the spacer being greater than the distance from said centerline to the outer periphery of the flanged element, whereby upon removal of all but one aligned securing bolt at each end the valve body may pivot around bolts to a position wherein said spacer and ball valve element may be removed.

6. A flange type ball valve adapted for end entry of the ball valve element, including in combination, a valve body comprising a body having a valve chamber, a counterbored passageway leading to said chamber and through which the ball valve element is insertable into said valve chamber, a flange on said body encircling said passageway, means including an annular spacer insertable into said passageway and having a flange abutting the counterbore for rotatably supporting the ball valve element, said spacer projecting a short distance axially outwardly of the flange on the body, said spacer also having an annular V-shaped groove on its external surface, set screw means on said body having pointed ends entering said groove and engageable with a wall of the groove for moving the spacer toward or holding it against the ball element, pipe coupling means including a flanged element engaging the projecting end of the spacer, said body flange and pipe coupling flanged element being circular and provided with aligned openings for securing bolts, and bolt means passing through said openings for holding the ball valve and flanged elements in assembled relation with the spacer flange abutting the counterbore, the distance from the centerline of the bolt openings to the peripheral portion of the projecting portion of the spacer being greater than the distance from said centerline to the outer periphery of the flanged element, whereby upon removal of all but one aligned securing bolt at each end the valve body may pivot around the bolts to a position wherein said spacer and ball valve element may be removed.

References Cited by the Examiner

UNITED STATES PATENTS

| | | | |
|---|---|---|---|
| 2,566,019 | 8/51 | Dempsey | 251—367 XR |
| 2,639,883 | 5/53 | Smith | 251—113 |
| 2,895,496 | 7/59 | Sanctuary | 251—151 XR |
| 2,929,400 | 3/60 | Neff | 251—366 XR |
| 2,981,284 | 4/61 | Putnam | 251—317 XR |
| 3,033,227 | 5/62 | Goldman | 251—171 XR |
| 3,037,738 | 6/62 | Jackson et al. | 251—315 XR |
| 3,064,938 | 11/62 | Knox | 251—315 |
| 3,081,791 | 3/63 | Wheatley | 137—454.2 |

FOREIGN PATENTS

| | | |
|---|---|---|
| 571,672 | 3/59 | Canada. |

LAVERNE D. GEIGER, *Primary Examiner.*